United States Patent
Yoshida et al.

(10) Patent No.: US 6,790,928 B2
(45) Date of Patent: Sep. 14, 2004

(54) PROCESS FOR PRODUCING POLYCARBONATES

(75) Inventors: Shu Yoshida, Ibaraki (JP); Hiroaki Tanaka, Ibaraki (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 0 days.

(21) Appl. No.: 10/380,667

(22) PCT Filed: Sep. 20, 2001

(86) PCT No.: PCT/JP01/08200
§ 371 (c)(1),
(2), (4) Date: Mar. 18, 2003

(87) PCT Pub. No.: WO02/24810
PCT Pub. Date: Mar. 28, 2002

(65) Prior Publication Data
US 2003/0195326 A1 Oct. 16, 2003

(30) Foreign Application Priority Data
Sep. 22, 2000 (JP) .................... 2000-289292

(51) Int. Cl.$^7$ .............................. C08G 64/00
(52) U.S. Cl. .................... 528/196; 528/198; 558/85; 558/89
(58) Field of Search .............. 528/196, 198; 558/85, 95

(56) References Cited

U.S. PATENT DOCUMENTS 4,910,283 A    3/1990  Kawaki et al.
5,942,594 A  * 8/1999  Nakae et al. ............. 528/196
6,608,165 B2 * 8/2003  Funakoshi et al. ........ 528/196

FOREIGN PATENT DOCUMENTS

| EP | 905183 | 3/1999 |
|---|---|---|
| JP | 11-293122 | 10/1999 |
| JP | 2000-9904 | 1/2000 |

* cited by examiner

Primary Examiner—Terressa Boykin
(74) Attorney, Agent, or Firm—Oblon, Spivak, McClelland, Maier & Neustadt, P.C.

(57) ABSTRACT

100 parts by weight of the polycarbonate produce by melt polycondensation of a carbonic acid diester and a dihydroxy compound and 0.0001 to 0.1 part by weight of a phosphite compound represented by following Formula (I) are formulated:

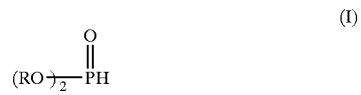

(I)

wherein Rs are each one of a hydrogen atom, an alkyl group, an aryl group, and an oxyalkyl group, where the two Rs are not concurrently hydrogen atoms. The process of the invention can yield polycarbonate molding materials that have satisfactory hue and can be used in a wide variety of applications such for optical materials.

15 Claims, No Drawings

PROCESS FOR PRODUCING POLYCARBONATES

TECHNICAL FIELD

The present invention relates to improvements in the thermal stability of polycarbonate resins produced by transesterification.

BACKGROUND ART

Polycarbonates obtained by interfacial polymerization of an aromatic dihydroxy compound such as 2,2-bis(4-hydroxyphenyl)propane (hereinafter referred to as BPA) with phosgene in the presence of an acid binder have satisfactory impact resistance and other mechanical properties, and exhibit high thermal resistance and transparency. They are thereby used as optical materials in, for example, lenses, prisms, and optical disk substrates.

However, such polycarbonates prepared by using BPA alone as the aromatic dihydroxy compound have a high photoelastic constant and a relatively low melt flowability to thereby yield molded articles showing a high degree of double refraction. In addition, they suffer an imbalance between refractive index and Abbe's number indicating the degree of dispersion, with a low Abbe's number of 30 but a high reflective index of 1.58, so they do not have sufficient capabilities for wide use in, for example, optical recording materials and optical lenses. To avoid these disadvantages of BPA-derived polycarbonates, a copolycarbonate of BPA and tricyclo(5.2.1.0$^{2,6}$)decane-dimethanol (hereinafter referred to as TCDDM) has been proposed (Japanese Patent Application Laid-open No. 64-66234).

However, the production process for copolycarbonates only teaches (1) polycondensation of a bischloroformate of BPA with TCDDM or TCDDM and BPA, (2) polycondensation of a bischloroformate of TCDDM with BPA or BPA and TCDDM, and (3) polycondensation of a mixture of a bischloroformate of BPA and a bischloroformate of TCDDM with BPA and/or TCDDM. To produce copolymers of an aliphatic dihydroxy compound and an aromatic dihydroxy compound in this type of two-stage reaction, a bischloroformate of a dihydroxy compound is initially produced, and the bischloroformate is then polycondensed with a dihydroxy compound. The two-stage reaction therefore complicates production process steps and thereby invites increased production cost.

A transesterification process of polycondensing a carbonic acid diester with a dihydroxy compound in a molten state is known as another possible production process. However, in the production process, the polymerization is performed at high temperatures for a long time to thereby often result in colored reaction products, and a catalyst remained in the polymer causes deterioration in physical properties of the polymer. This tendency is noticeable especially in polycarbonates having an aliphatic structure.

DISCLOSURE OF INVENTION

Accordingly, an object of the present invention is to provide a process for stabilizing a polycarbonate produced by transesterification.

After intensive investigations under these circumstances, the present inventors have found that very satisfactory thermal stability can be imparted to a polycarbonate prepared by transesterification by adding a specific phosphite compound to the polycarbonate. The present invention has been accomplished based on these findings.

Specifically, the present invention provides, in one aspect, a process for producing a polycarbonate, comprising the steps of melt polycondensing a carbonic acid diester and a dihydroxy compound in the presence of a catalytic alkali metal and/or alkaline earth metal to yield a polycarbonate, and incorporating 0.0001 to 0.1 part by weight of a phosphite compound represented by following Formula (I) into 100 parts by weight of the polycarbonate:

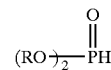

wherein Rs are each one of a hydrogen atom, an alkyl group containing 1 to 18 carbon atoms, an aryl group, and an oxyalkyl group containing 1 to 8 carbon atoms, where the two Rs are not concurrently hydrogen atoms.

The present invention also provides, in another aspect, the process for producing a polycarbonate in which the dihydroxy compound is one of an aromatic dihydroxy compound, an aliphatic dihydroxy compound, and a mixture of both.

The present invention provides, in yet another aspect, the process for producing a polycarbonate in which 0.0001 to 0.3 part by weight of one of a phosphonium salt of an aromatic sulfonic acid, an aromatic sulfonic acid ester, or an alkylsulfuric acid is incorporated into 100 parts by weight of the polycarbonate.

Best Mode for Carrying Out the Invention

The present invention will be described in detail below.

Aromatic carbonic acid diesters for use in the present invention are compounds represented by following Formula (II):

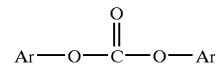

wherein Ars are the same or different and are each a monovalent aromatic group.

Examples of the aromatic carbonic acid diesters represented by Formula (II) include diphenyl carbonate, ditolyl carbonate, dixylyl carbonate, bis(propylphenyl) carbonate, bis(octylphenyl) carbonate, bis(nonylphenyl) carbonate, bis(methoxyphenyl) carbonate, and bis(ethoxyphenyl) carbonate, of which diphenyl carbonate is typically preferred. The chlorine content in the aromatic carbonic acid diester is preferably less than or equal to 1 ppm. The amount of the aromatic carbonic acid diester is preferably from 0.97 to 1.2 mole and more preferably from 0.99 to 1.10 mole per mole of the total dihydroxy compound(s).

Dihydroxy compounds for use in reactions according to the present invention include aromatic dihydroxy compounds and aliphatic dihydroxy compounds.

Such aromatic dihydroxy compounds for use in the reactions according to the present invention include compounds represented by following Formula (III):

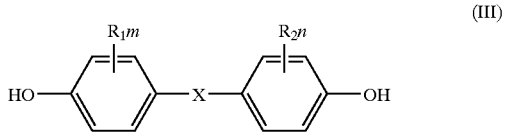

(III)

wherein X is a single bond or

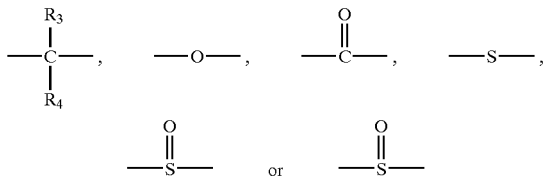

wherein $R_3$ and $R_4$ are each one of a hydrogen atom, an alkyl group containing 1 to 10 carbon atoms, and a phenyl group, where $R_3$ and $R_4$ may be combined to form a ring; $R_1$ and $R_2$ are the same or different and are each one of a hydrogen atom, an alkyl group containing 1 to 10 carbon atoms, and a halogen; and m and n are each a number of substituents and are each an integer from 0 to 4.

Examples of the dihydroxy compounds represented by Formula (III) include bis(4-hydroxyphenyl)methane, 2,2-bis(4-hydroxyphenyl)propane, 2,2-bis(4-hydroxy-3-methylphenyl)propane, 2,2-bis(4-hydroxy-3-t-butylphenyl)propane, 2,2-bis(4-hydroxy-3,5-dimethylphenyl)propane, 2,2-bis(4-hydroxy-3,5-dibromophenyl)propane, 4,4-bis(4-hydroxyphenyl)heptane, 1,1-bis(4-hydroxyphenyl)cyclohexane, and other bisphenols; 4,4'-dihydroxydibiphenyl, 3,3',5,5'-tetramethyl-4,4'-dihydroxybiphenyl, and other biphenols; bis(4-hydroxyphenyl) sulfone, bis(4-hydroxyphenyl) sulfoxide, bis(4-hydroxyphenyl) sulfide, bis(4-hydroxyphenyl) ether, and bis(4-hydroxyphenyl) ketone. Among them, 1,1-bis(4-hydroxyphenyl)cyclohexane (hereinafter briefly referred to as BPZ) is typically preferred. Two or more of the aromatic dihydroxy compounds represented by Formula (III) can be used in combination.

The aliphatic dihydroxy compounds include dihydroxy compounds having an alicyclic structure. Examples of such dihydroxy compounds having an alicyclic structure are tricyclo(5.2.1.0$^{2,6}$)decanedimethanol, β,β,β',β'-tetramethyl-2,4,8,10-tetraoxaspiro[5,5]undecane-3,9-diethanol (spiroglycol), entacyclo[9.2.1.1$^{3,9}$.0$^{2,10}$.0$^{4,8}$]-pentadecanedimethanol, pentacyclo[9.2.1.1$^{4,7}$.0$^{2,1}$.0.0$^{3,8}$]pentadecanedimethanol, 2,6-decalindimethanol, and 1,4-cyclohexanedimethanol. Among them, tricyclo(5.2.1.0$^{2,6}$) decanedimethanol represented by following Formula (IV) is typically preferred.

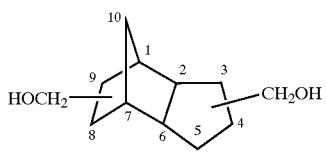

(IV)

These dihydroxy compounds having an alicyclic structure contain a carbonyl group, if any, as an impurity in an amount in terms of KOH of less than or equal to 1.0 mg/g, preferably less than or equal to 0.5 mg, and more preferably less than or equal to 0.1 mg. The contents of chlorine and metallic ions are preferably each less than or equal to 1 ppm.

Copolycarbonates can be prepared by using two or more of these dihydroxy compounds in combination. Among such copolycarbonates, aromatic-aliphatic copolycarbonates using an aromatic dihydroxy compound and an aliphatic dihydroxy compound as raw materials are suitable for optical applications.

According to the present invention, a phosphite represented by following Formula (I) is added to such a polycarbonate produced by transesterification:

(I)

wherein Rs are each one of a hydrogen atom, an alkyl group containing 1 to 18 carbon atoms, an aryl group, and an oxyalkyl group containing 1 to 8 carbon atoms.

The phosphites represented by Formula (I) include, but are not limited to, diphenyl phosphite, dibenzyl phosphite, di-n-butyl phosphite, didodecyl phosphite, diethyl phosphite, diisopropyl phosphite, dilauryl phosphite, and dimethyl phosphite. Each of these phosphites can be used alone or in combination.

The amount of the phosphite(s) is from 0.0001 to 0.1 part by weight, preferably from 0.0005 to 0.08 part by weight, and more preferably from 0.01 to 0.05 part by weight relative to 100 parts by weight of the polycarbonate. If the amount is less than this range, desired advantages may not be obtained. If it exceeds this range, thermal resisting properties and mechanical properties may decrease.

An alkali metal compound and/or an alkaline earth metal compound is used as a catalyst in the present invention. Preferred examples of such compounds are organic acid salts, inorganic salts, oxides, hydroxides, hydrides, and alkoxides of alkali metals and alkaline earth metals. Each of these compounds can be used alone or in combination.

Such alkali metal compounds include, but are not limited to, sodium hydroxide, potassium hydroxide, cesium hydroxide, lithium hydroxide, sodium hydrogencarbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium phenyl borate, sodium benzoate, potassium benzoate, cesium benzoate, lithium benzoate, disodium hydrogenphosphate, dipotassium hydrogenphosphate, dilithium hydrogenphosphate, disodium phenylphosphate, as well as the disodium salts, dipotassium salts, dicesium salts, and dilithium salts of bisphenol A, and the sodium salts, potassium salts, cesium salts, and lithium salts of phenols.

Examples of the alkaline earth metal compounds are magnesium hydroxide, calcium hydroxide, strontium hydroxide, barium hydroxide, magnesium hydrogencarbonate, calcium hydrogencarbonate, strontium hydrogencarbonate, barium hydrogencarbonate, magnesium acetate, calcium acetate, strontium acetate, barium acetate, magnesium stearate, calcium stearate, calcium benzoate, and magnesium phenylphosphate.

The amount of these catalysts is from $10^{-9}$ to $10^{-3}$ mole and preferably from $10^{-7}$ to $10^{-5}$ mole per mole of the total dihydroxy compound(s).

Addition of a phosphonium salt of an aromatic sulfonic acid in combination with the phosphite is also effective. Such phosphonium salts of aromatic sulfonic acids include, for example, tetrabutylphosphonium benzenesulfonate, tetrabutylphosphonium p-toluenesulfonate, tetrabutylphosphonium butylbenzenesulfonate, tetrabutylphosphonium octylbenzenesulfonate, tetrabutylphosphonium dodecylbenzenesulfonate, tetramethylphosphonium dodecylbenzenesulfonate, tetraethylphosphonium dodecylbenzenesulfonate, and tetrahexylphosphonium dodecylbenzenesulfonate.

The amount of the phosphonium salts of aromatic sulfonic acids is from 0.0001 to 0.03 part by weight and preferably from 0.001 to 0.01 part by weight relative to 100 parts by weight of the polycarbonate. If the amount is less than this range, desired advantages may not be obtained. If it exceeds this range, thermal resisting properties and mechanical properties may decrease.

In combination with the phosphite, it is also effective to add p-toluenesulfonic acid, and other aromatic sulfonic acids; butyl p-toluenesulfonate, hexyl p-toluenesulfonate, and other esters of aromatic sulfonic acids; dimethylsulfuric acid, and other alkylsulfuric acids; and boric acid, phosphoric acid, phosphorous acid, and other inorganic acids.

The amount of these substances is from 0.0001 to 0.03 part by weight and preferably from 0.001 to 0.01 part by weight relative to 100 parts by weight of the polycarbonate. If the amount is less than this range, desired advantages may not be obtained. If it exceeds this range, thermal resisting properties and mechanical properties may decrease.

In addition, conventional additives can be used according to the intended use and purpose. Such additives include, for example, thermal stabilizers, hydrolysis inhibitors, antistatic agents, lubricants, antioxidants, coloring agents, fillers (reinforcements), mold releasing agents, plasticizers, infrared absorbents, and antimicrobial agents. Each of these additives can be used alone or in combination.

Such antioxidants include, for example, phosphorus compounds and hindered phenolic compounds.

Examples of the phosphorus compounds are triethyl phosphite, triisopropyl phosphite, triisodecyl phosphite, tridodecyl phosphite, phenyldiisodecyl phosphite, diphenylisodecyl phosphite, triphenyl phosphite, tris-tolyl phosphite, phenyl-bis(4-nonylphenyl) phosphite, tris(4-octylphenyl) phosphite, tris[4-(1-phenylethyl)phenyl] phosphite, tris(2,4-di-t-butylphenyl) phosphite, pentaerythritol-bis[(2,6-di-t-butyl-4-methylphenyl)phosphite], pentaerythritol-bis[(2,4-di-t-butylphenyl)phosphite], and other phosphite compounds; tetrakis(2,4-di-t-butylphenyl)-4,4'-biphenylene diphosphonite, tetrakis(2,4-di-t-butylphenyl)-4,4'-(2,2-diphenylpropane) phosphonite, and other phosphonite compounds; and dimethyl phenylphosphonate, and other phenylphosphonate compounds. Each of these compounds can be used alone or in combination.

The amount of the phosphorus compound(s) is from 0.005 to 0.2 part by weight, and preferably from 0.01 to 0.1 part by weight relative to 100 parts by weight of the polycarbonate. If the amount is less than this range, desired advantages may not be obtained. If it exceeds this range, thermal resisting properties and mechanical properties may decrease.

The hindered phenolic compounds include, for example, pentaerythrityl-tetrakis[3-(3,5-di-t-butyl-4-hydroxyphenyl)-propionate], 1,6-hexanediol-bis[3-(3,5-di-t-butyl-4-hydroxyphenyl)-propionate], octadecyl 3-(3,5-di-t-butyl-4-hydroxyphenyl)-propionate, 1,3,5-trimethyl-2,4,6-tris(3,5-di-t-butyl-4-hydroxybenzyl)benzene, triethyleneglycol-bis[3-(3-t-butyl-5-methyl-4-hydroxyphenyl)propionate], 3,9-bis{2-[3-(3-t-butyl-4-hydroxy-5-methylphenyl)propionyloxy-1,1-dimethylethyl}-2,4,8,10-tetraoxaspiro[5,5]undecane, and 1,1,3-tris[2-methyl-4-(3,5-di-t-butyl-4-hydroxyphenylpropionyloxy)-5-t-butylphenyl]butane. Each of these hindered phenolic compounds can be used alone or in combination.

The amount of the hindered phenolic compound(s) is from 0.005 to 0.1 part by weight, preferably from 0.01 to 0.08 part by weight, and more preferably from 0.01 to 0.05 by weight relative to 100 parts by weight of the polycarbonate. If the amount is less than this range, desired advantages may not be obtained. If it exceeds this range, thermal resisting properties and mechanical properties may decrease.

The ultraviolet absorbents include, but are not limited to, 2-(5-methyl-2-hydroxyphenyl)benzotriazole, 2-[2-hydroxy-3,5-bis($\alpha,\alpha$-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl)benzotriazole, 2-(2'-hydroxy-5'-t-octylphenyl)benzotriazole, 2,2'-methylenebis[4-(1,1,3,3-tetramethylbutyl)-6-[(2H-benzotriazol-2-yl)phenyl]], 2-(4,6-diphenyl-1,3,5-triazin-2-yl)-5-[(hexyl)oxy]-phenol, 2,4-dihydroxybenzophenone, 2-hydroxy-4-n-octyloxybenzophenone, 2-hydroxy-4-methoxy-2'-carboxybenzophenone, polycondensates of dimethyl succinate and 1-(2-hydroxyethyl)-4-hydroxy-2,2,6,6-tetramethylpiperidine, bis(1-octyloxy-2,2,6,6-tetramethyl-4-piperidyl) sebacate, and bis(2,2,6,6-tetramethyl-4-piperidyl) sebacate. Each of these ultraviolet absorbents can be used alone or in combination.

The mold releasing agents include conventional mold releasing agents such as natural paraffins, synthetic paraffins, silicone oils, polyethylene waxes, beeswax, monoglyceride of stearic acid, monoglyceride of palmitic acid, pentaerythritol tetrastearate, and other fatty acid esters. Each of these mold releasing agents can be used alone or in combination.

The timing of addition of these catalyst inactivators, additives, and other components is not specifically limited. In general, these substances are added when the product resin is still in a molten state after the completion of the polycondensation reaction or is added when the resin is again molten after it is cooled and pelletized. A horizontal agitator having excellent impellers is used herein.

The procedure for adding these substances is also not specifically limited. They can be added, for example, by directly supplying them into a polymerization reactor and mixing with the other components or by kneading the components using a single-screw or double-screw extruder. When such an extruder is used, the temperature of the molten resin is preferably controlled within ranges from 230° C. to 300° C. and more preferably from 240° C. to 270° C. If the temperature is lower than this range, the additives may not be sufficiently dispersed and sufficient advantages may not be exhibited. If it exceeds this range, thermal deterioration of the resin may be accelerated to thereby cause coloring.

By using a vent-type extruder under reduced pressure, low-boiling compounds such as monomers remaining in the polymer can be removed concurrently with the addition and kneading of the additives. In this case, addition of a devolatilization auxiliary such as water is also effective for the removal of such low-boiling compounds.

The additives can be added in any form. For example, they can be added as intact without dilution, can be diluted in a miscible solvent before addition or can be added in the form of a master batch.

The polycarbonate for use in the present invention has a weight-average molecular weight of preferably from 20,000 to 200,000 and more preferably from 40,000 to 120,000.

The transesterification relating to the present invention can be performed according to a known melt polycondensation procedure. Specifically, a polycondensation reaction is performed using the raw materials and catalyst with heating at ordinary pressure or under a pressure while removing monohydroxy compounds by-produced as a result of transesterification.

The reaction is generally performed in two- or more multistage processes. More specifically, a first-stage reaction is performed at 120° C. to 260° C. and preferably 180° C. to 240° C., for 0.1 to 5 hours and preferably for 0.5 to 3 hours. Next, a reaction among an aromatic dihydroxy compound, an aliphatic dihydroxy compound and an aromatic carbonic acid diester is performed with an elevating reaction temperature and an increasing degree of decompression of the reaction system, and ultimately, a polycondensation reaction is performed at a temperature from 200° C. to 300° C. at a reduced pressure of 1 mmHg or less. The reactions can be performed in any of continuous systems and batch systems. Reactors for use in the reactions include tank-type, extruder-type and horizontal agitators having impellers with satisfactory surface renewal action, such as paddle impellers, grid impellers, and swivel impellers.

When the resin of the present invention is used in optical applications, it is preferably produced in, for example, a clean room or clean booth to avoid contamination by the inclusion of foreign matter into the product. In this case, such contamination by foreign matter can be effectively prevented by arranging a filter for the raw materials, a filter for cooling water used in pelletization, or a polymer filter at an outlet of the extruder.

EXAMPLES

The present invention will be illustrated in further detail with reference to several examples and comparative examples below, which are not intended to limit the scope of the present invention. Analytical instruments and determination conditions employed in the determination of physical properties are as follows.
(1) Weight-average Molecular Weight (Mw)

The weight-average molecular weight (Mw) was determined as a molecular weight in terms of styrene using a gel permeation chromatograph (GPC, Shodex GPC system 11) with chloroform as an eluent.
(2) Solution Hue (dYI)

A total of 9.0 g of a sample was dissolved in 90 ml of methylene chloride to yield a solution, the yellow index (YI) of the solution was determined using a 5.0-cm quartz glass cell, and the difference (dYI) between the determined YI and a YI of methylene chloride alone was determined. A spectrophotometer SE-2000 available from NIPPON DENSHOKU INDUSTRIES CO., LTD. was used as a color difference meter.
(3) Stability in Retention (dYI)

A total of 2.0 g of a sample was placed in a test tube, was dried at 120° C. under flow of nitrogen gas for 2 hours using DRY BLOCK BATH AL-301 available from SCINICS Corporation and was subjected to a retention test at 260° C. under flow of nitrogen gas for 2 hours. The sample was cooled to room temperature, was dissolved in 20 ml of methylene chloride to yield a solution, the yellow index (YI) of the solution was determined using a 5.5-cm quartz glass cell, and the difference (dYI) between the determined YI and a YI of methylene chloride alone was determined. A spectrophotometer SE-2000 available from NIPPON DENSHOKU INDUSTRIES CO., LTD. was used as a color difference meter.

PREPARATION EXAMPLE 1

In a nickel-clad tank-type reactor, 4560 g (20 mol) of 2,2-bis(4-hydroxyphenyl)propane, 4391.5 g (20.5 mol) of diphenyl carbonate, and 1303 mg ($4\times10^{-3}$ mol) of anhydrous cesium carbonate were placed, were melted at 160° C. in an atmosphere of nitrogen gas, were stirred for 1 hour, were raised in temperature while gradually reducing the pressure, and were subjected to polycondensation at 270° C. ultimately at 1 Torr for 4 hours, followed by removal of produced phenol by distillation. The reaction mixture was further subjected to a reaction in a double-screw self-cleaning reactor for 50 minutes and thereby yielded a colorless transparent polycarbonate resin. The obtained polycarbonate had a weight-average molecular weight of 55000 and a solution hue YI of 1.10. Another colorless transparent polycarbonate resin was obtained by the polymerization procedure as above, except that 160 mg ($4\times10^{-3}$ mol) of sodium hydroxide was used as the catalyst. The obtained polycarbonate had a weight-average molecular weight of 56000 and a solution hue YI of 1.13.

PREPARATION EXAMPLE 2

In 50-L polymerization vessel made of nickel, 6038.0 g of 1,1-bis(4-hydroxyphenyl)cyclohexane (BPZ), 4416.5 g of tricyclo($5.2.1.0^{2,6}$)decanedimethanol (TCDDM), 10025.5 g of diphenyl carbonate, and $2.0\times10^{-6}$ mol/mol of 0.1 wt % calcium acetate aqueous solution as a catalyst per mole of the total of BPZ and TCDDM were placed, followed by replacement with nitrogen gas three times. The charged materials were then heated to 180° C. and were stirred and dissolved at ordinary pressure for 30 minutes.

The mixture was allowed to react at a polymerization temperature of 210° C. at a reduced pressure of 150 mmHg for 1 hour, to react at a polymerization temperature of 230° C. at a reduced pressure of 15 mmHg for 1 hour and then to react at a temperature of 240° C. at a pressure of 0.2 mmHg for 2 hours. After the completion of the reaction, the resulting polycarbonate was taken out in an atmosphere of nitrogen gas and was pelletized. The obtained polycarbonate had a weight-average molecular weight of 56500 and a solution hue YI of 1.07. Another colorless transparent polycarbonate resin was obtained by the above polymerization procedure, except that sodium hydrogencarbonate was used as the catalyst. The obtained polycarbonate had a weight-average molecular weight of 57000 and a solution hue YI of 1.11.

EXAMPLE 1

The polycarbonate pellets prepared in Preparation Example 1 were dried at 90° C. at 1 mmHg for 12 hours. A master batch comprising 50 ppm of diphenyl phosphite (available from Tokyo Chemical Industry Co., Ltd.) relative to the weight of the pellets, 0.05 part by weight of bis(2,6-di-t-butyl-4-methylphenyl)pentaerythritol-diphosphite (available from Asahi Denka Co., Ltd., under the trade name of ADEKASTAB PEP-36) and 0.01 part by weight of 5,7-di-t-butyl-3-(3,4-dimethylphenyl)-3H-benzofuran-2-one (available from Chiba Specialty Chemicals Corporation under the trade name of HP-136) relative to 100 parts by weight of the polycarbonate was mixed with the pellets, the mixture was kneaded in a double-screw kneader-extruder and was pelletized again. The resulting pellets had a weight-average molecular weight of 55600, a solution hue YI of 0.96, and a stability in retention dYI of 1.77.

EXAMPLE 2 AND COMPARATIVE EXAMPLES 1 to 4

A series of polycarbonates was prepared by the procedure of Example 1, except that the types and amounts of the additives were changed as indicated in Table-1. The physical properties of the prepared polycarbonates were determined, and the results are shown in Table-1.

EXAMPLES 3 AND 4 AND COMPARATIVE EXAMPLES 5 to 8

A series of polycarbonates was prepared by the procedure of Example 1, except that the types and amounts of the additives were changed as indicated in Table-2 and that the polycarbonate pellets prepared in Preparation Example 2 were used. The physical properties of the prepared polycarbonates were determined, and the results are shown in Table-2.

TABLE 1

| | Catalyst | Stabilizer | Mw (Before Extrusion) (After Extrusion) | Solution Hue (Before Extrusion) (After Extrusion) (dYI) | Stability in Retension (dYI) |
|---|---|---|---|---|---|
| Ex* 1 | Cs$_2$CO$_3$ | DPP* | 55,000 54,900 | 1.10 0.98 | 0.98 |
| Ex 2 | NaOH | DPP | 56,000 54,100 | 1.13 1.06 | 0.98 |
| CEx* 1 | Cs$_2$CO$_3$ | — | 55,000 49,500 | 1.10 1.54 | 1.85 |
| CEx 2 | Cs$_2$CO$_3$ | H$_3$PO$_3$ | 55,000 52,300 | 1.10 1.32 | 1.42 |
| CEx 3 | NaOH | — | 56,000 48,900 | 1.13 1.55 | 1.77 |
| CEx 4 | NaOH | H$_3$PO$_3$ | 56,000 51,500 | 1.13 1.25 | 1.58 |

TABLE 2

| | Catalyst | Stabilizer | Mw (Before Extrusion) (After Extrusion) | Solution Hue (Before Extrusion) (After Extrusion) (dYI) | Stability in Retension (dYI) |
|---|---|---|---|---|---|
| Ex 3 | Ca(OAc)$_2$ | DPP | 56,500 55,900 | 1.07 0.99 | 1.00 |
| Ex 4 | NaHCO$_3$ | DPP | 57,000 56,300 | 1.11 1.05 | 1.21 |
| CEx 5 | Ca(OAc)$_2$ | — | 56,500 47,100 | 1.07 1.68 | 1.95 |
| CEx 6 | Ca(OAc)$_2$ | H$_3$PO$_3$ | 56,500 56,100 | 1.07 1.32 | 1.73 |
| CEx 7 | NaHCO$_3$ | — | 57,000 48,100 | 1.11 1.45 | 1.99 |
| CEx 8 | NaHCO$_3$ | H$_3$PO$_3$ | 57,000 55,900 | 1.11 1.23 | 1.69 |

Note:
Ex*: Example
CEx*: Comparative Example
DPP*: Diphenyl phosphite

Industrial Application

The present invention can produce polycarbonates with satisfactory thermal stability to thereby yield molding materials that have satisfactory hue and can be used in a wide variety of applications such as for optical materials, by incorporating a specific amount of a phosphite having a specific structure into a polycarbonate.

What is claimed is:

1. A process for producing a polycarbonate, comprising the steps of: melt polycondensing a carbonic acid diester and a dihydroxy compound in the presence of a catalytic alkali metal and/or alkaline earth metal compound, thereby yielding a polycarbonate, and incorporating 0.0001 to 0.1 part by weight of a phosphite compound represented by Formula (I) into 100 parts by weight of the polycarbonate:

(I)

wherein each R group is independently a hydrogen atom, an alkyl group containing 1 to 18 carbon atoms, an aryl group, or an oxyalkyl group containing 1 to 8 carbon atoms, with the proviso that the two R groups are not concurrently hydrogen.

2. The process for producing a polycarbonate according to claim 1, wherein the dihydroxy compound is an aromatic dihydroxy compound.

3. The process for producing a polycarbonate according to claim 1, wherein the dihydroxy compound is an aliphatic dihydroxy compound.

4. The process for producing a polycarbonate according to claim 1, wherein the dihydroxy compound is a mixture of an aromatic dihydroxy compound and an aliphatic dihydroxy compound.

5. The process for producing a polycarbonate according to any one of claims 1, 2 and 4, wherein the dihydroxy compound is selected from the group consisting of compounds represented by Formula (III):

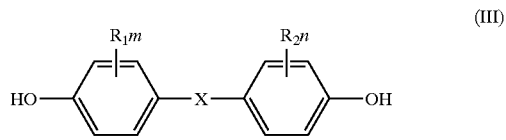

(III)

wherein X is a single bond or

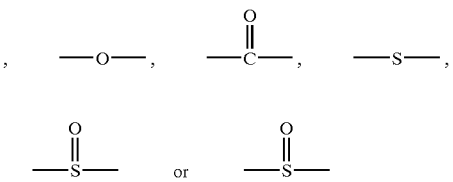

wherein $R_3$ and $R_4$ are each independently a hydrogen atom, an alkyl group containing 1 to 10 carbon atoms, or a phenyl group, or $R_3$ and $R_4$ may be combined to form a ring; $R_1$ and $R_2$ are the same or different and each independently is a hydrogen atom, an alkyl group containing 1 to 10 carbon atoms, or halogen; and m and n each designates a number of substituents and each is an integer from 0 to 4.

6. The process for producing a polycarbonate according to claim 5, wherein the aromatic dihydroxy compound is 1,1-bis(4-hydroxyphenyl)cyclohexane.

7. The process for producing a polycarbonate according to claim 3 or 4, wherein the aliphatic dihydroxy compound is selected from the group consisting of alicyclic dihydroxy compounds.

8. The process for producing a polycarbonate according to claim 7, wherein the alicyclic dihydroxy compound is tricyclo(5.2.1.0$^{2,6}$)decanedimethanol represented by Structural Formula (IV):

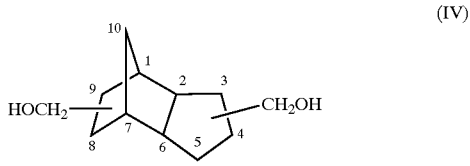

(IV)

9. The process for producing a polycarbonate according to claim 1, further comprising incorporating 0.0001 to 0.3 part by weight of a phosphonium salt of an aromatic sulfonic acid into 100 parts by weight of the polycarbonate.

10. The process for producing a polycarbonate according to claim 1, further comprising incorporating 0.0001 to 0.3 part by weight of an aromatic sulfonic ester or an alkylsulfuric acid into 100 parts by weight of the polycarbonate.

11. The process for producing a polycarbonate according to claim 1, wherein the amount of said phosphite compound ranges from 0.0005 to 0.08 part by weight.

12. The process for producing a polycarbonate according to claim 11, wherein the amount of said phosphite compound ranges from 0.01 to 0.05 part by weight.

13. The process for producing a polycarbonate according to claim 1, wherein said phosphite is diphenyl phosphite, dibenzyl phosphite, di-n-butyl phosphite, didodecyl phosphite, diethyl phosphite, diisopropyl phosphite, dilauryl phosphite or dimethyl phosphite.

14. The process for producing a polycarbonate according to claim 1, wherein the amount of said catalyst ranges from $10^{-9}$ to $10^{-3}$ mole per mole of the total amount of hydroxy compound.

15. The process for producing a polycarbonate according to claim 14, wherein the amount of said catalyst ranges from $10^{-7}$ to $10^{-5}$ mole per mole of the total amount of hydroxy compound.

* * * * *